O. G. HITCHCOCK.
COMBINED STOP AND WASTE COCK.
APPLICATION FILED JAN. 16, 1914.
1,236,372.
Patented Aug. 7, 1917.
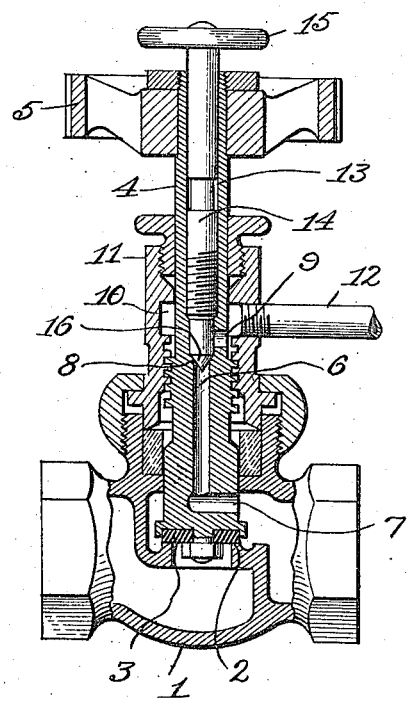

UNITED STATES PATENT OFFICE.

OTTO G. HITCHCOCK, OF ERIE, PENNSYLVANIA, ASSIGNOR TO HAYS MANUFACTURING COMPANY, OF ERIE, PENNSYLVANIA, A CORPORATION OF PENNSYLVANIA.

COMBINED STOP AND WASTE COCK.

1,236,372.    Specification of Letters Patent.    Patented Aug. 7, 1917.

Application filed January 16, 1914. Serial No. 812,424.

*To all whom it may concern:*

Be it known that I, OTTO G. HITCHCOCK, a citizen of the United States, residing at Erie, in the county of Erie, State of Pennsylvania, have invented new and useful Improvements in Combined Stop and Waste Cocks, of which the following is a specification.

My invention relates to combined stop and waste cocks, and has for its objects to provide an improved construction of the same capable of manipulation separately and presented in compact form.

These objects I accomplish in the manner and by the means hereinafter described and claimed, reference being had to the accompanying drawing, in which:

The figure is a central vertical sectional view of a stop cock embodying my improved construction.

In the said drawing the reference numeral 1 denotes a valve casing of any suitable construction, the same having therein a valve seat 2 adapted to be closed by valve 3 carried by valve stem 4 and manipulated through handle 5, all of said parts except said valve stem being of any conventional construction.

The valve stem 4 is formed at its lower end with a vertical passageway or duct 6 terminating at its lower end in a horizontal duct 7 communicating with the valve casing at one side of the valve. At its upper end said duct 6 is enlarged to form a conical valve seat 8, a horizontal orifice 9 forming a means of communication between said enlarged portion of duct 6 and an annular chamber 10 formed in the interior of the bonnet piece 11 of valve casing 1 and into which a waste pipe 12 is tapped.

Forming a continuation of duct 6 is a still further enlargement 13 extending to the top of said valve stem, the same being screw threaded at its lower end to receive the screw threaded lower end of a solid valve stem 14, the same having an operating wheel 15 at its upper end and terminating at its lower end in a cone-shaped valve 16 adapted to seat on and close valve seat 8.

In operation with the parts in the position shown in the drawing the valve 3 is seated, as is the cone valve 16, thus closing the waste discharge through pipe 12. But when it is desired to open said waste discharge the same may be accomplished by unscrewing valve stem 14 which will unseat cone valve 16 and afford an escape for the fluid to the right of valve 3 through ducts 7 and 6, orifice 9, chamber 10 and pipe 12.

The position of duct 7 is such that when the valve 3 is unseated to open the same said duct 7 will be sealed by the valve casing 1 through the upward movement of the valve stem 4.

Having thus described my invention, what I claim as new and desire to secure by Letters Patent is:

1. A combined stop and waste valve, embodying a valve casing, a main valve therein, a hollow valve stem for said main valve, a waste discharge pipe, ports through said valve stem affording communication between the discharge side of said main valve and said waste discharge pipe when said main valve is closed, but sealed by said casing when said main valve is open, and a separately adjustable valve and stem for said waste discharge disposed in said main valve stem and in screw threaded engagement therewith.

2. In a compression stop and waste cock, a union having a central partition, said partition having a valve seat, a sleeve member threaded to move in said union, said sleeve carrying a valve member adapted to seat on said valve seat, said sleeve having a bore terminating in a reduced portion, a collar surrounding a portion of the sleeve, said collar being spaced from the sleeve to provide a fluid chamber, said sleeve having an opening providing communication between the chamber and the bore, means for moving the sleeve, an auxiliary valve operating in the bore of the sleeve for controlling the flow of fluid through the sleeve and a discharge passage from the fluid chamber.

In testimony whereof, I have hereunto set my hand in the presence of two subscribing witnesses.

OTTO G. HITCHCOCK.

Witnesses:
PERCY B. HILLS,
JOSEPH J. ROLL.

Copies of this patent may be obtained for five cents each, by addressing the "Commissioner of Patents, Washington, D. C."